United States Patent [19]

Schönfeld et al.

[11] 4,300,197

[45] Nov. 10, 1981

[54] PROCESS AND APPARATUS FOR THE CENTERING OF BODIES OF ROTATION HAVING UNEVEN MASS DISTRIBUTION ALONG THEIR SHAFT AXIS

[75] Inventors: Harald Schönfeld, Darmstadt; Heinrich Hack, Reinheim; Ludwig Arras, Gross Zimmern, all of Fed. Rep. of Germany

[73] Assignee: Carl Schenck AG, Fed. Rep. of Germany

[21] Appl. No.: 33,045

[22] Filed: Apr. 25, 1979

[30] Foreign Application Priority Data

May 27, 1978 [DE] Fed. Rep. of Germany ....... 2823219

[51] Int. Cl.³ ............................................. G01M 1/16
[52] U.S. Cl. ..................................... 364/508; 73/461
[58] Field of Search ............. 364/508, 506, 559, 463; 73/463, 461

[56] References Cited

U.S. PATENT DOCUMENTS

| | | | |
|---|---|---|---|
| 3,651,690 | 3/1972 | Pagdin et al. | 364/506 X |
| 3,996,804 | 12/1976 | Neufeld | 364/508 X |
| 4,064,704 | 12/1977 | Blackburn | 364/508 X |
| 4,098,127 | 7/1978 | Shiga et al. | 364/463 X |
| 4,109,312 | 8/1978 | Beutel | 364/463 X |
| 4,109,312 | 8/1978 | Beutel | 364/508 |
| 4,135,244 | 1/1979 | Davis | 364/508 |

FOREIGN PATENT DOCUMENTS

| | | |
|---|---|---|
| 913364 | 10/1956 | Fed. Rep. of Germany . |
| 975086 | 8/1961 | Fed. Rep. of Germany . |
| 975210 | 11/1961 | Fed. Rep. of Germany . |
| 1159183 | 12/1963 | Fed. Rep. of Germany . |
| 2105998 | 8/1972 | Fed. Rep. of Germany . |

OTHER PUBLICATIONS

Vibro Control, SV No. C1311-1, C1311-2, C1311-3, C1311-4, C1311-5, C1311-6.
Lineare IC's Funktion and Anwendung, 2, Ausgabe, Transition Electronic GmbH
Schenck Type BBS 07, Drawing No. 198282-½.
Schenck Type M 423.
Evershed Great Britain Type FC 44B.
Schenck Type BRA 03.
Schenck Type BV 21 and BBE 1.
Schenck Drawing Nos. 197 910-1, 2 and 3.
Schenck Drawing Nos. 197 579-1, 2 and 3.
Schenck Drawing Nos. 145 0741.

Primary Examiner—Edward J. Wise
Attorney, Agent, or Firm—Connolly and Hutz

[57] ABSTRACT

The invention relates to a process and apparatus for the centering of rotational bodies having uneven mass distribution along the shaft axis, particularly crankshafts, in a dynamic centering machine, whereby a working axis is obtained by shifting both ends of the rotational body as opposed to the axis of rotation of the dynamic centering machine.

14 Claims, 6 Drawing Figures

PROCESS AND APPARATUS FOR THE CENTERING OF BODIES OF ROTATION HAVING UNEVEN MASS DISTRIBUTION ALONG THEIR SHAFT AXIS

BACKGROUND OF THE INVENTION

From DE-PS No. 975,210, a process of the above-mentioned type is known which is distinguished in that the determination of the working axis of the body takes place on a process machine provided, similarly to a balancing machine, with a rocker-mounted receiving device in such a manner that the body is brought to an oscillation-free rotation in the rocker-mounted receiving device, which beforehand has been provided with an imbalance measured in such a manner that the latter compensates that imbalance which has resulted from the subsequent processing of a body rotating about its free axis as the working axis. Such a centering process has the disadvantage that it may be carried out only in a series and with a characteristic common to the series. Individual processing of each part from the series in accordance with its own characteristics is impossible.

In accordance with a further process and an arrangement for the balancing of preprocessed bodies by the shifting of their principal axis of inertia (DE-PS No. 913,364), it is proposed that by dynamic centering, an axis of rotation be determined which leaves in the rotational body the correction imbalance sufficing for the requirement that it be dropped in the final machining of predetermined areas of the rotational body for accuracy of rotation about this axis of rotation (final machining axis of rotation). Such a procedure also does not include the possibility of an individual handling of each part of a series in accordance with its own characteristics. Furthermore, this process and this device are not suitable for the centering of an elongated rotational body.

Known from DE-AS No. 11 59 183 is a process and a device for the dynamic centering of work pieces, which is distinguished in that the work piece holding fixture, provided with such an artificial imbalance that the center of mass of the work piece holding fixture is shifted into concentricity with the same eccentricity and angular position as shown by the center of mass of the work piece; that, henceforth, the center of mass of the work piece holding fixture, correspondingly shifted by the application of the imbalance together with the center of mass of the work piece, is automatically brought to pivot, by the rotation of the entire arrangement at an overcritical rate of revolutions, into the axis of rotation of the revolving holding fixture basket; and that subsequently the work piece uptake in the holding fixture basket is established and the work piece is centered. This relates to a dynamic centering with respect to an overcritically running structural unit and, furthermore, to the dynamic centering for a single plane.

In a machine for the centering of rotational bodies according to DE-PS No. 975,086 it is claimed that an electrical imbalance measuring arrangement of the type of the known electrical loop is provided with four-position switch, which measures the imbalance in four components, independent of each other, and in particular in preferably perpendicular components each, on two selected reference planes and switches the hand-actuated four-position switch thereof for the switching of the measuring arrangement to one of the four components; necessarily also the adjusting arrangement pertaining to each component. This arrangement is suitable merely for the compensation of the imbalance effects setting in the adjustment of the adjusting arrangments.

SUMMARY

In order to enable an individual processing also of series products, it is the object of the invention to obtain a dynamically centered body of rotation with an uneven mass distribution along its shaft axis, wherein the lowest possible residual imbalance is present after the final machining and which, furthermore, is within functional limit values. This object is solved according to the invention in that for the determination of the working axis in two planes of the rotational body, its imbalances are constantly compared with an imaginary imbalance each, corresponding to the parallel displacement of the shaft axis with respect to the rotational axis and to the incline of the shaft axis to the rotational axis, and that a certain resulting imbalance value per plane marks the working axis and that a limit value giving a maximum structural displacement of the shaft axis toward the rotational axis is taken into consideration. By means of the novel process, both a monitoring of the entire body in view of the final machining is achieved and, furthermore, care is taken that the working axis is placed in such a manner that the imbalance of the final-machined shaft is considerably reduced.

A development of the invention consists in that the surfaces of the rotationally-symmetric parts of the rotational body containing the shaft axis are scanned and that their least distance to the rotational axis of the dynamic centering machine is compared with a given limit value. In a particularly advantageous manner, the least distance between rotational axis and surface is thereby determined.

In still a further development of the novel idea, it is suggested that the surface of two rotationally symmetric parts containing the shaft axis be scanned, that these values be transformed to other planes, wherein the limit value comparison is carried out. As a result of this development of the novel idea, it is possible to select the most suitable measuring planes for curved rotational bodies which are to be dynamically centered.

In still a further development of the novel idea, it is suggested that for the determination of the imaginary imbalance, increments resulting from the parallel displacement of the shaft axis and the increments resulting from the tilt of the shaft axis be taken into consideration with various circumstances. By the novel variable consideration, the influence between the tilt of the shaft to be centered and the parallel displacement thereof are taken into consideration in view of a later processing in a corresponding manner, since the tilt of the shaft axis corresponds to a dynamic imbalance effect while the parallel displacement corresponds to a static imbalance effect.

In yet a further development of the novel idea, it is suggested that in a surface scanning by an ancillary harmonic analysis per scanning factor, the parallel displacement and tilt of the shaft axis are determined. By means of this harmonic analysis, it is achieved that even the lack of roundness of the rotational body is eliminated on the surface to be scanned and thus cannot incorrectly affect the measuring result.

In yet a further development, it is suggested that information on the parallel displacement and tilt of the shaft axis be obtained from the position of the ends. This novel development of the process is particularly advantageous then when aside from the two ends of the rotational body to be centered, the rotational body cannot be scanned in other planes.

An apparatus for carrying out the process with a dynamic centering machine and the balanced adjusting and tensioning devices arranged therein for the rotational body to be centered is also distinguished in that at the support for the dynamic centering machine, there is arranged a deviation fom alignment gauge which determines the distance between the rotational axis of the dynamic centering machine and the shaft axis of the rotational body per plane. The arrangement of the deviation from alignment gauge at the support for the dynamic centering machine offers the specific advantage that an accurate distance measurement can be carried out. In the development of this device, it is suggested that the surface of the rotationally-symmetric parts containing the shaft axis be radially scanned during rotation without contact by means of sensing elements. By means of the contact-free scanning of the rotationally-symmetric parts by means of approximation initiators on a mechanical, optical or electrical basis offers the advantages that wear on the sensing elements cannot occur.

Another development of the novel idea consists in that the surface of the rotationally symmetric parts containing the shaft axis is radially scanned with contact during rotation by means of a sensing element. Particularly with respect to rotational bodies with uneven mass distribution along their shaft axis, the rotationally symmetric parts having only a slight elongation in the direction of the longitudinal axis, it is particularly advantageous to employ contacting sensing elements on the rotationally symmetric part, despite mechanical wear, as a result of the good matching possibility. The sensing elements in this instance may be rollers, balls or scanning skids.

Another development of the novel device consists of transmitters being connected with the adjusting and back-up arrangements which during the rotation of the adjusting and tensioning devices transmit a signal each, corresponding to a path information, to receivers, arranged on the support and pertaining to the transmitters, in accordance with their immediate position.

This development of the novel device is particularly suitable when the displacement of the rotational body is to be determined in components. In a development of this idea, it is suggested that the radial distance between transmitter and corresponding receiver be utilized as the path information. As a result of measuring the radial distance without contact or with contact, a reproducible reproduction of the position of the adjusting and back-up devices for the particular end of the rotational body is possible in the simplest form. In place of the measurement of the radial distance, it is also feasible to represent the position of the adjusting and back-up devices with the help of a transit time measurement. For this purpose, a rotatable lever is resiliently connected with an adjusting or back-up arrangement by emans of spring force, for example. At its end facing away from the adjusting or back-up arrangement, it is provided with a transmitter which is situated at a distance from a receiver, arranged on the support. Upon shifting the particular ends of the rotational body with respect to the rotational axis of the dynamic centering machine, an angular course is traveled, as a result of the rotation of the lever, which is different from the original position of the transmitter in the state prior to be renewed deflection. At the same time, by virtue of the fulcrum of the lever, which is dissimilar from the rotational axis of the dynamic centering machine, a change will set in of the radial distance between the fixed receiver at the support and the movable transmitter. With a constant rotational speed of the dynamic centering machine, the immediate position of the back-up and adjusting arrangement can be determined then depending on the time difference between the original signal and the changed signal.

The process according to the invention can also be carried out by a dynamic centering machine and the balanced adjusting and tensioning devices arranged therein for the rotational body to be centered, which is distinguished in that a potentiometer slider is connected with each of the adjusting drive units and back-up elements, said slider effecting a change in resistance of the potentiometer pertaining thereto depending on the movements of the adjusting drive units and back-up elements and that these signals are brought to the outside by means of slip rings. In place of the slip rings, high-frequency transmitters may also be used for the transmission of the measuring factors in accordance with the invention. Such device with potentiometers produces a constant and continuous signal with regard to the immediate movement of the adjusting and back-up device.

A switching device for the novel apparatus for the carrying out of the novel process is distinguished in that the information, transformed into electrical voltages concerning the distance of the surface of the rotationally symmetric parts containing the shaft axis with respect to the rotational axis of the dynamic centering machine of a computer circuit is supplied separately for each measuring plane; that in the computer circuit all information is transformed, feedback-free, to a further plane pair; that at the outputs of the computer circuit, there is undertaken for each plane separately a limit value monitoring of the information which leads, as the case may be, to a completion of the dynamic centering procedure; and that at the same time the feedback-free transformed information is subjected by means of a further computer circuit to the above-mentioned factors; and that at the output thereof, such information is conducted by means of individual computer circuits, wherein the first harmonic of the oscillation is formed separately for each plane; the fictive imbalance thus obtained for each plane is separately compared with the actually occurring imbalance in each plane and the adjusting procedure is completed upon achieving uniformity. The special advantage of such electrical switching procedure is that the highest direct dependence on the scanning results and the functional limit values of the dynamic centering procedure is obtainable, something which leads to a considerable improvement.

Another switching device for the novel apparatus for carrying out the process, wherein only the displacement of the back-up and adjusting devices, holding the ends of the rotational body, is measured, is distinguished in that the path information, transformed into electrical voltages, concerning the position of the adjusting and back-up devices, with respect to the rotational axis, at the ends of the rotational body and in particular per one end of the rotational body is formed into two components, staggered by 90°, consisting of the particular differences between the particular collaborating back-up element and the adjusting device; that, for one thing, for each plane and components are added vectorially;

that the result of this addition is compared with a limit value, upon the exceeding of which the dynamic centering procedure is completed in such plane; that, for another thing, the components of both planes with the same angular position, separated according to angular position, are affected by given factors by means of a computer circuit; and that the imaginary imbalance components thus obtained are compared with the corresponding measured components in each plane; and that the adjusting procedure is completed upon reaching uniformity. Such novel switching mechanism equally allows, by measuring the displacement of the backup and adjusting devices holding the ends of the rotational body, the carrying out of a guidance of the dynamic centering machine with the help of which the dynamic centering is maximizable.

A development of such switching mechanism is that the electrical voltages, corresponding to the particular position of the individual back-up and adjusting devices, are subjected to a limit value monitoring and that upon exceeding a given limit value, the particular component adjustment met is completed. By means of such novel development, it becomes possible to stop each component per se during a component adjustment in the event that limit value given for such component, which is selected on the basis of functional data, is exceeded or is achieved. The novel process, which may be carried out by means of the novel apparatus and novel switching mechanisms, may be used particularly advantageously for rotating camshafts, crankshafts and eccentric shafts for driving presses.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 2 is a schematic diagram of transmitters and receivers for the determination of the position of the shaft axis of the body to be centered with respect to the axis of rotation of the dynamic centering machine, which is one embodiment of this invention;

FIG. 2(a) is a cross-sectional view taken through FIG. 2 along the line 2a—2a;

DESCRIPTION OF THE PREFERRED EMBODIMENTS

Figure 1A:
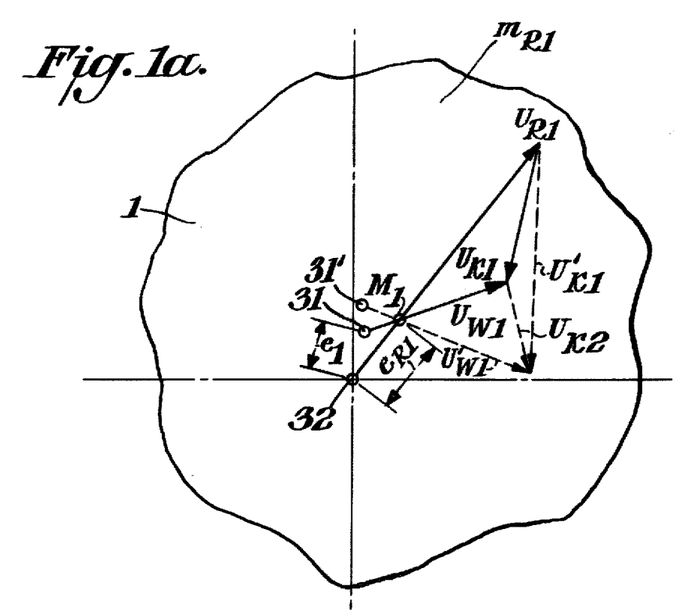
FIG. 1(a) shows schematically, a disk of a component of mass, on which no further processing is carried out after dynamic centering.

FIG. 1(a) schematically shows a disk 1 which constitutes a component of a partial mass of a body to be centered on which no processing is undertaken after dynamic centering. With respect to a crankshaft, this, for example, would be a crankweb with or without a counterweight. $M_1$ is the center of mass of the disk. In the uncentered state, disk 1 has an intitial shaft axis 32, which, as a result of the irregular distribution of the mass $m_{R1}$, produces an imbalance effect $U_{R1}$. For an individual compensation of imbalance $U_{R1}$, a displacement of the rotational axis to the center of mass $M_1$ would be required, the path of displacement $e_{R1}$ having to correspond to the quotient of imbalance vector and mass. However, since the subject body does not relate to a disk-shaped body with tapering thickness in axial direction, such individual compensation is impossible. A crankshaft to be centered, for example, can be displaced only as a whole.

With rotation of the crankshaft in a dynamic centering machine about the shaft axis 32, the entire effect of the individual imbalance $U_{R1}$ and $U_{R2}$ is measured and the total effect of the individual masses $M_{R1}$ and $M_{R2}$ is counterpoised by displacement of the crankshaft in such a manner that the resultant imbalance is compensated and a new rotational axis 31 results in the crankshaft, the crankshaft being generally askew with respect to its original shaft axis 32. Thus, there results a displacement course ($e_1$), viewed in axial direction, for each disk 1 and thus for each respective mass component $m_{R1}$. This displacement course is not identical with $e_R$, as a result of which a residual imbalance $U_{W1}$ remains for the individual components of mass. The total effect of these residual imbalances becomes zero by virtue of the dynamic centering, referring to axis 31. Disk 1 contributes a vlue for the dynamic centering which corresponds to the magnitude of the vector $U_{K1}$. $U_{K1}$ equals here the product of $e_1$ and $m_{R1}$.

Figure 1B:
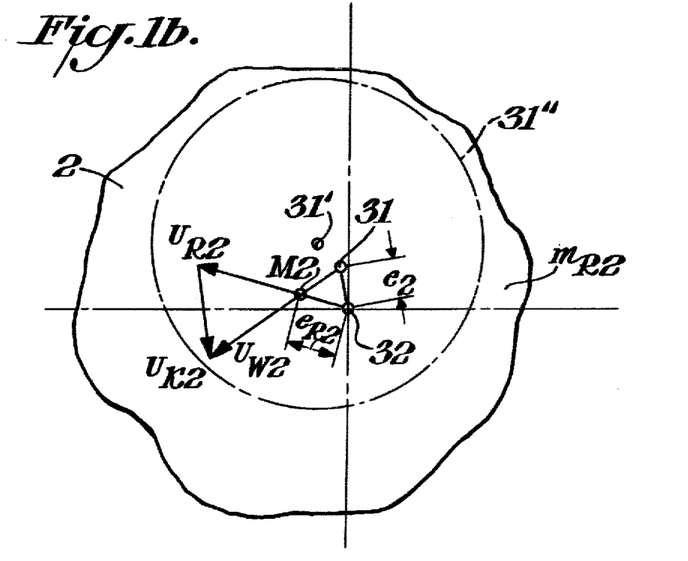
FIG. 1(b) shows schematically, a disk of a component of mass, on which mechanical processing is carried out after dynamic centering.

FIG. 1(b) illustrates a disk 2 to be processed which is adjacent to disk 1; in the case of a crankshaft, it relates to a main pivot point or a crank pin or the shaft ends. $M_2$ is the center of mass of disk 2 to be processed. Even for disk 2 to be processed, three results, as described for disk 1, first of all a displacement $e_{R2}$ of the center of mass $M_2$ as opposed to the shaft axis 32. After the dynamic centering, there results a displacement $e_2$ of the new rotational axis 31 as opposed to shaft axis 32. The contribution of disk 2 to dynamic centering is equal to vector $U_{K2}$, which is formed analogously to disk 1.

A processing of the circumference of disk 2 takes place concentrically about axis 31. All imbalances of disk 2 and thus also the value of vector $U_{K2}$ are thereby eliminated. Thus, the balance of all $U_K$ values is disturbed, something which would lead to the processed crankshaft's having a greater imbalance than the dynamically centered crankshaft prior to processing. By further shifting of rotational axis 31 into a position 31' during the dynamic centering procedure, there results on disk 1 a compensation imbalance $U_{K1}'$, which is greater than $U_{K1}$ by the value $U_{K2}$. The loss occurring due to the processing of disk 2 is thereby equalized to the compensation of value $U_{K2}$.

Furthermore, rotational axis 31' may not be so far removed from the original rotational axis 32 of the crude shaft of the rotational body to be centered that a processing about rotational axis 31' (shown by the circle 31" in phantom outline in FIG. 1b) leads to a reject.

Figures 2, 2A:
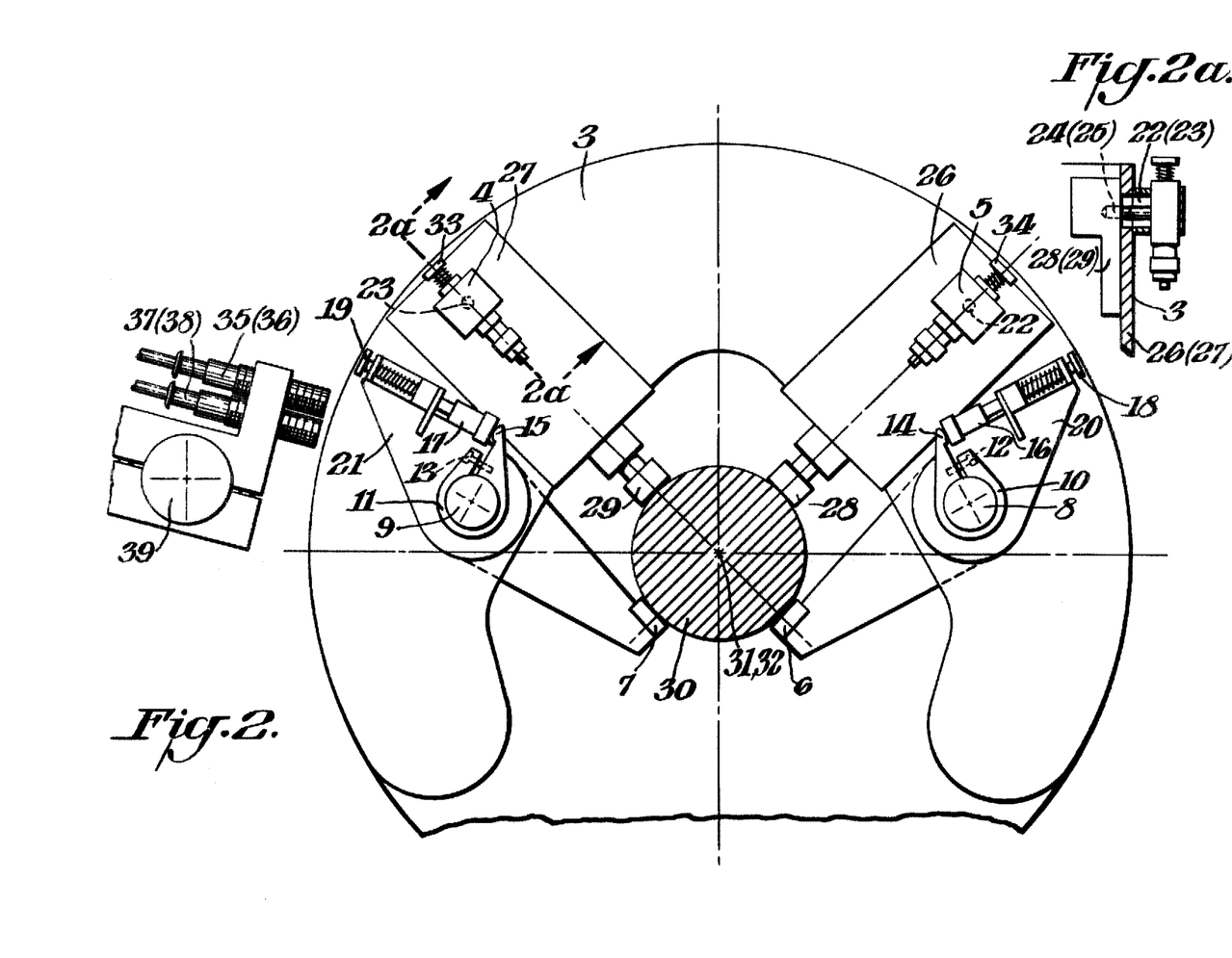

FIG. 2 represents an arrangement of transmitters and receivers for the determination of the position of the shaft axis of the body to be centered with respect to the rotational axis of the dynamic centering machine. The dynamic centering machine per se is not illustrated. The arrangement of receivers on the support of the balancing machine is illustrated schematically with an omission of unessential parts. The mounting of one end of the rotational body is illustrated.

Both adjusting drive units 26, 27 as well as tensioning elements 6, 7 are arranged on a circular disk 3. In this connection, adjusting drive unit 26 collaborates with the back-up element 7 and adjusting drive unit 27 collaborates with back-up element 6. Back-up elements 6 and 7 are each mounted on a pivot rod 8, 9 by means of which a lever 10, 11 is mounted on the outside of the circular disk 3. The lever being firmly connected by means of screws 12, 13 with pivot rods 8 and 9. Levers 10, 11 each support a cantilever 14, 15 which are connected with spring-loaded pins 16, 17. Each spring-loaded pin 16, 17 supports at its outer end a flat steel plate transmitter 18, 19. Furthermore, each spring-loaded pin 16, 17 is arranged on a fishplate 20, 21. It is provided that each spring-loaded pin 16, 17 is arranged in a different axial plane exactly as each adjusting member 4, 5 is equally arranged in a different axial plane along the rotational axis. Thus, upon a measurement, a separation of the individual results is very easily possible owing to the axial separation if care is taken that for the coordinated receivers the same axial distance is also selected. Adjusting members 4, 5 are connected through a slot 22, 23 (FIG. 2a) in the circular disk 3 by means of a bolt 24, 25 with an adjusting drive unit 26, 27, which engage by means of a striker 28, 29 with a shaft end 30 of a rotational body.

Back-up element 7 pertains to striker 28 and back-up element 6 pertains to striker 29. FIG. 2 represents a dynamic state, wherein rotational axis 31 of the dynamic centering machine and the processing axis 32 of the rotational body to be centered coincide in an axial line.

During the dynamic centering procedure, each adjusting drive unit 26, 27 is optionally affected by means of non-illustrated receivers and further processed. Adjusting drive units 26 and 27 engage at an angle of 90° with shaft end 30 and in collaboration with the back-up elements 7 and 6. As easily understood, the shaft axis 32 may be moved out of the position of the rotational axis 31 of the dynamic centering machine, so that the shaft axis 32 for example, of a crankshaft stands askew with respect to the rotational axis 31 of the dynamic centering machine. If no further imbalance information is supplied in components to the adjusting drive units 26, 27, the adjusting drive units with their strikers 28, 29 and the back-up elements 6, 7 secure the body to be centered in the adjusted position.

For a constant monitoring as to whether this position corresponds also to the given conditions with respect to structural limit values, such as a limit value concerning the processing without exclusion of a crankshaft pin, it is necessary to monitor in each phase the position of the shaft end 30 of the body to be centered. For this purpose, adjusting members 4, 5 at their ends facing the rim of circular disk 3 carry adjusting flat steel plate transmitters 33, 34. If, as described above, at the beginning of the dynamic centering run-here, the processing axis 32 of the body to be centered need not coincide with the rotational axis 31 of the dynamic centering machine; it may relate, for example, to the axial position of the previously removed crankshaft, i.e. to an arbitrary dynamic centering run-the position of transmitters 18, 19, which represent the position of the back-up elements 6, 7 and the adjusting transmitters 33, 34, which indicate the position of strikers 28, 29, is scanned by their coordinated receivers 35, 37, or 36, 38. Receivers 35, 36, 37 and 38 are of the type described in Schenck prospectus C 1311-1, published in 1977, especially page 5, FIGS. 1, 2, 3. Schenck prospectus C 1311-2, C 1311-3, C1311-4, C 1311-5 and C 1311-6 are all data sheets for prospectus C 1311-1. The paths transformed into electrical signals then represent the immediate position of shaft end 30 of the rotational body to be dynamically centered. Receivers 35, 36, 37, 38 are connected by means of a pillar 39 with the non-illustrated support of the dynamic centering machine. For an easier adjusting, the receivers are pivotally arranged about pillar 39.

During the dynamic centering run, when the imbalance effect setting in each plane is picked up as well in components and is utilized for the guidance of the adjusting drive units 26, 27 per plane, the distance of the adjusting transmitters 33, 34 and of transmitters 18, 19 is altered as compared to receivers 35, 36, 37, 38 which are arranged in a stationary manner on the support.

By virtue of the receivers 35, 36, 37, 38 arranged in varisou axial plane, which collaborate with transmitters 18, 19 or adjusting transmitters 33, 34, arranged in the respective axial planes, per end of the body to be dynamically centered, the limit value concerning evaluating the position of back-up element 7 and of striker 28, can also be retained, for example, as a component in a storage unit, which upon exceeding the limit value in this component direction switches off the adjusting drive unit 26, for example, while adjusting drive unit 27 in combination with the back-up element 6 can carry out still a further adjustment of the shaft end until the imbalance functioning in this component direction is balanced. Thus, a procedure is achieved, whereby by virtue of the dynamic centering procedure the waste in final machining of such bodies can be considerably lowered and, furthermore, a considerable proportion of rotational bodies also no longer need to be balanced after the dynamic centering and after final machining. With a respective development, lever 10, 11 can engage with cantilever 14, 15 in place of the spring-loaded pin 16, 17. If cantilever 14, 15 is guided to the rim of circular disk 3 and provided with a pulse transmitter corresponding to transmitter 18 or 19, then the transmitter, upon adjustment of the processing axis 32, will take a different position in peripheral direction, due to the horizontal swing of cantilever 15 about pivot rod 8, 9. The distance between the corresponding receiver, changing thereby, should not be considered. The change achieved in peripheral direction alone will produce with each revolution a different time of rotation as opposed to the original time of rotation. The difference between the individual times of rotation, as an angular displacement of cantilever 15, 14, as opposed to its original position, can equally hold true as a measure for the immediate position of processing axis 32.

It is also possible to use potentiometers in place of adjusting members 4, 5 or of spring-loaded pins 16, 17, the particular potentiometer wipers are engaging with the potentiometer conforming to bolts 24, 25 and conforming to cantilevers 14, 15 in order to produce the immediate position of processing axis 32. Such a measuring arrangement has the advantage of the continuous possibility, whereby simultaneously the collaboration between striker 29 and back-up element 6, for example, is also drawn upon in order to effect the limit value for switching off of these components upon exceeding the given structural limit value.

Figure 3:
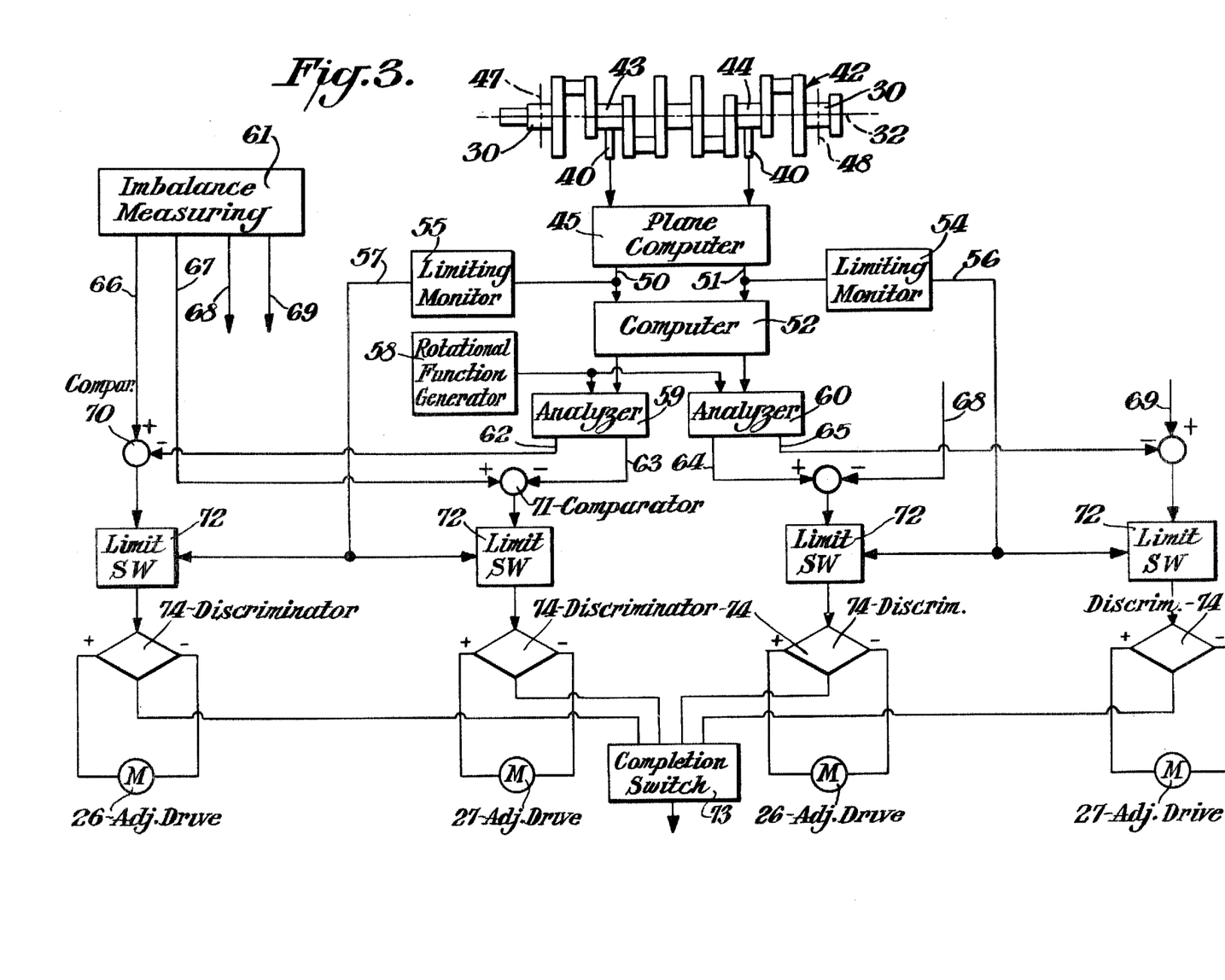
FIG. 3 is a block schematic diagram of a novel electrical switching mechanism for the dynamic centering by means of path monitoring of the rotating parts of the body to be scanned for an embodiment of this invention.

FIG. 3 illustrates a block schematic of a novel electrical switching mechanism for dynamic centering by means of arbitrary scanning of the body to be centered. According to FIG. 3, a crankshaft 42, incorporated in a dynamic centering machine, is polar-scanned during the adjustment of processing axis 32 by wipers 40 of rotationally symmetric parts 43, 44 with contact or, by means of proximity initiators, for example, without contact. The values thus obtained contain both information on the parallel shifting as well as the incline of processing axis 32, relative to the rotational axis of the dynamic centering machine. In a plane computer circuit 45, the information obtained by scanning the rotationally symmetric parts 43, 44 is first transformed to another plane pair 47, 48, wherein shaft end 30 is situated. Thus, the displacement of the shaft end with processing axis 32 contained therein is precisely polar-determined relative to the rotational axis of the dynamic centering machine.

The information existing at the outputs 50, 51 of the plane computer circuit 45 is supplied to a computer circuit 52 and, parallel thereto, to path monitoring arrangements 54, 55, wherein the structurally set limit values for final processing of the rotationally symmetric parts are stored. Useful designs for computers 45 and 52 are shown and described in U.S. Pat. No. 2,289,074. Due to the arrangement of two path monitoring arrangements, 54, 55, it is possible to switch off, separately for each plane, the adjusting drive units 26, 27 for each shaft end 30, depending on the limit value, by means of information leads 56, 57.

The computer circuit 52, together with a function generator 58 and utilizing analyzers 59, 60, serves for the determination of an imaginary imbalance, separated into components for each plane, to be further processed. In this connection, the information coming from the computer circuit 4, 5 is provided in computer circuit 52 with factors corresponding to the amount of the parallel displacement of processing axis 32 and to the incline of processing axis 32. As stated above, these amounts depend on the static imbalance proportion, which corresponds to the parallel displacement of the processing axis, and to the dynamic imbalance proportion, which in turn corresponds to the incline of processing axis 32. The information thus obtained is then supplied, separately for each plane, to an analyzer 50 or 60 each, to which is also supplied the information coming from a function generator 58 concerning rotational number or the relative angular position of crankshaft 42 to be investigated. The function generator 48 is coupled in the simplest manner with the drive of the dynamic centering machine, so that a clear reference is obtained for a later comparison with the actually occurring imbalances, which for each plane containing the shaft end 30 had been separated into components.

In analyzers 59, 60 the information from the computer circuit 52 and the information respecting the immediate position of crankshaft 42, which is given by function generator 58, are then jointly processed, so that in analyzers 59, 60, the first harmonic of the oscillation can be formed separately for each plane and that at outputs 62, 63 of analyzer 59 and at outputs 64, 65 of analyzer 60, the imaginary imbalance value, divided into components for each plane separately, is available for further utilization.

Figure 4:
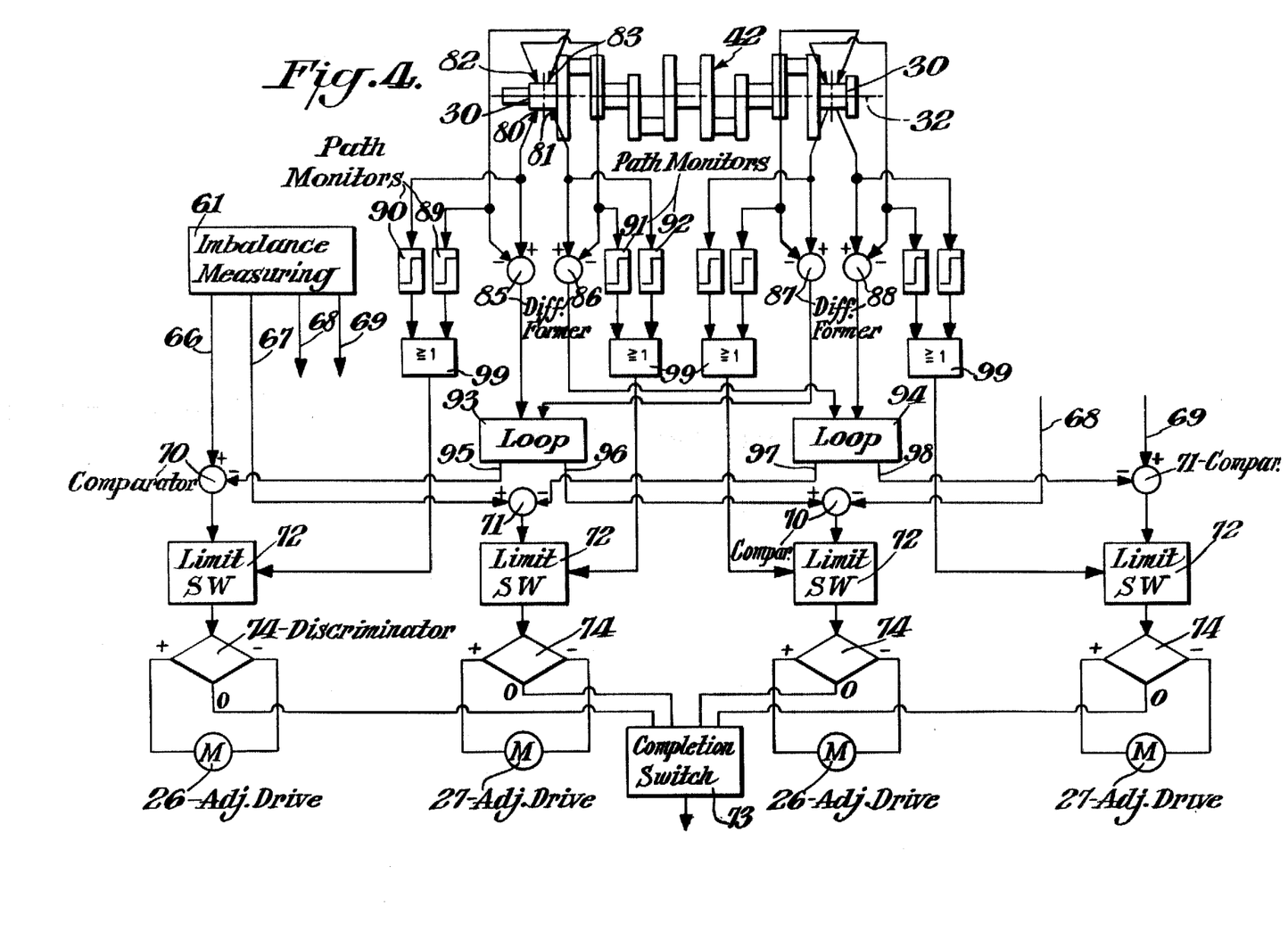
FIG. 4 is a block schematic diagram of another novel switching mechanism for the dynamic centering with path monitoring at the ends of the body to be centered, for another embodiment of this invention.

At outputs 66, 67 or 68, 69 of the imbalance measuring device 61, the imbalance effects resulting due to the shifting of shaft axis 32 occur in components. Thus, the imbalance information occurring at the imbalance measuring device outputs 66, 67, for example, is compared in components, separately for each component, in comparators 70 or 71 with the imaginary imbalance information occurring at outputs 62, 63 of analyzer 59. With a balance between the values at output 62 and at the imbalance measuring arrangement output 66, adjusting drive unit 26, for example, is stopped if beforehand adjusting drive unit 26 had not been switched off already by means of information lead 57 in a limit switch 72. FIG. 3 and FIG. 4 show discriminators 74, located between limit switches 72 and completion switch 73, controlling the motor 26 and 27, wherein if the voltage is positive, the motors 26 and 27 turn clockwise, if the voltage is negative the motors 26 and 27 run counterclockwise and if the voltage is near zero the motors 26 and 27 stop. After turning off the control drive unit 26, 27 for each plane, wherein shaft end 30 are crankshaft 42 is contained, the completion of the dynamic centering procedure is indicated by means of a switch 73.

FIG. 4 shows a block schematic of another novel electrical switching mechanism for dynamic centering, wherein the position of shaft axis 32 is utilized directly with the aid of the scanning of back-up elements 6, 7 and of adjusting drive units 26, 27 (FIG. 2) per plane in order to effect an optimum dynamic centering procedure. The effective direction of back-up elements 6, 7, shifted by 90°, is illustrated by arrows 80, 81 and the effective direction of adjusting drive units 26, 27 also reciprocally shifted by 90°, collaborating with the back-up elements is illustrated by arrows 82, 83. Crankshaft 42 to be dynamically centered is inserted by its shaft ends in a non-illustrated dynamic centering machine by means of back-8p elements 6, 7 and of adjusting drive units 26, 27. Here, as also in the arrangement of FIG. 3, is is unessential whether shaft axis 32 coincides with the rotational axis of the dynamic centering machine.

At the beginning of the dynamic centering run and also during the dynamic centering run, there is determined, for one thing, the position of each back-up element and the position of each adjusting drive unit with respect to the rotational axis of the dynamic centering machine. This gives the structurally set limit value for the processing possibility of each rotationally symmetric part. For another thing, the particular position of shaft axis 32 to the rotational axis 31 of the dynamic centering machine, i.e. the parallel displacement and the incline of shaft axis 32 to the rotational axis 31 of the dynamic centering machine, is constantly monitored. This monitoring takes place by the differential formation between the position of a back-up unit, e.g. 7, with the immediate position of the adjusting drive unit, e.g. 27, pertaining to the back-up element, which is illustrated in FIG. 4 as collaborating arrows 80 and 83. This information is supplied, upon storage, to differential formers 85, 86 for the one plane and to differential formers 87, 88 for the other plane. In place of the thus-described monitoring by means of constant scanning by adjusting drive unit 26, 27 and back-up element 6, 7 at the beginning of the dynamic centering procedure, still prior to rotation, the adjusting drive gears may be brought into a well-defined position, according to the invention; the back-up elements 6, 7 are brought to bear upon the crankshaft, which serves the diameter determination of the shaft; and the curvature of the crankshaft may also be determined by a further measuring device, which is arranged between the two shaft ends.

It is achieved thereby that during the dynamic centering run only the position of the adjusting drive units is left to be monitored, which is carried out by controlling the stepping motor or by scanning the path of adjustment. The information resulting thereby is further processed in accordance with the switching mechanism illustrated in FIG. 4.

An imbalance-measuring device 61, corresponding to FIG. 3, has at its output 66, 67 or 68, 59, separated into components for each plane wherein a shaft end 30 is situated, the actually occurring imbalances, which by dynamic centering should be made zero or a given value. By means of component path monitoring 89, 90, or 91, 92 and OR elements 99 as already indicated in FIG. 3, the respective adjusting drive unit 26 or 27 can be stopped separately for each plane upon the exceeding of a limit value.

In the differential formers 85 or 87, the same component directions are processed for each plane, while in differential formers 86 and 88 the same components, displaced by 90° for both planes, are processed. Accordingly, only information corresponding to one component direction in both planes is supplied to loops 93 or 94, and from here the corresponding imaginary imbalances are formed, taking into consideration the various factors for the parallel displacement of processing axis 32 as opposed to the incline of processing axis 32. The loop output 95 of loop 93 is connected with comparator 70 to which the imbalance measuring arrangement output 66 is also connected. Loop output 97 of loop 94 is connected with comparator 71, which is equally connected with the imbalance-measuring arrangement output 67 for a shaft end plane. If the actually occurring imbalance component signals in comparators 70 or 71 are equal to the signals of the imaginary imbalance components, adjusting drive units 26 and 27 are switched off for one plane. In the same manner, the dynamic centering procedure is completed in the other plane. The elements with the numerals 54, 55, 70, 71, 85, 86, 88, 89, 90, 91, 92 are comparators like prospectus "lineare IC's Funktion und Anwendung, 2. Ausgabe" Transition Electronic GmbH.

The element with the numeral 72 is Schenck Type BSS 07 drawing number 198282-½.

The element with the numeral 61 is Schenck Type M 423.

The element 58 is Evershed Great Britain Type FC 44 B

The element with the numeral 45 is Schenck Type BRA 03.

The elements 59, 60 are Schenck Type BV 21 and BBE 1.

We claim:

1. A process for centering rotational bodies having uneven mass distribution along a shaft axis, particularly crankshafts, in a dynamic centering machine, whereby a processing axis is obtained by shifting both ends of the rotational body relative to the axis of rotation of the dynamic centering machine, comprising the steps in that for the determination of the processing axis in two planes of the rotational body, its imbalances are compared with an imaginary imbalance corresponding to the parallel displacement of the shaft axis with respect to the rotational axis and to the incline of the shaft axis to the rotational axis, that a predetermined imbalance value per plane is associated with the processing axis, and that a limit value providing a maximum structural displacement of the shaft axis toward the rotational axis is taken into consideration.

2. A process as set forth in claim 1, wherein surfaces of rotationally symmetric parts of the rotational body containing the shaft axis are scanned, and their least distance to the rotational axis of the dynamic centering machine is compared with a given limit value.

3. A process as set forth in claim 2, wherein the surfaces of two rotationally-symmetric parts containing the shaft axis are scanned to obtain values and the values are transformed to other planes, wherein the limit value comparison is carried out.

4. A process as set forth in any one of claims 1 or 2, wherein fact for the determination of the imaginary imbalance, increments resulting from the parallel displacement of the shaft axis and increments resulting from the inclination of the shaft axis are taken into consideration.

5. A process as set forth in claim 4, wherein the ends of the rotational body are shifted, characterized in that information on the parallel displacement and inclination of the shaft axis are obtained from the position of the ends.

6. A process in accordance with any one of claims 1, 2 or 4, wherein that in surface scanning by an ancillary harmonic analysis per scanning factor, the parallel displacement and inclination of the shaft axis are determined.

7. An apparatus for centering rotational bodies having uneven mass distribution along a shaft axis, particularly crankshafts, in a dynamic centering machine comprising balanced adjusting and back-up means for holding the rotational body to be centered, the dynamic centering machine having a support frame, a deviation from alignment gauge for determining the distance between the rotational axis of the dynamic centering machine and the shaft axis of the rotational body per plane being mounted on the support frame.

8. An apparatus as set forth in claim 7, wherein a sensing means is mounted on the frame for radially scanning surfaces of rotationally symmetrical parts of the rotational body without contact.

9. An apparatus as set forth in claim 7, wherein a sensing means is mounted on the frame for radially scanning surfaces of rotationally symmetrical parts of the rotational body with contact.

10. An apparatus as set forth in claim 7, wherein transmitting devices are mounted on the support in operative connection to the adjustment drive and back-up means for transmitting a signal depending on the instantaneous position of the adjusting drive and back-up means.

11. An apparatus as set forth in claim 10, wherein receivers are mounted on the support frame adjacent the transmitting devices and distanced therefrom and the distances being utilized to determine the deviation and inclination of the shaft.

12. An apparatus as set forth in any one of claims 7, 8, 9, 10 or 11, wherein potentiometer slider means is connected to each of the adjusting drive and back-up means whereby the slider effects a change in resistance of the potentiometer depending on the movement of the adjusting drive and back-up means, and slip rings being connected to the potentiometer sliders to carry off the resistances being provided thereby.

13. A switching mechanism for use in conjunction with the apparatus set forth in any one of claims 7, 8, 9, 10 or 11 comprising electrical signals generating means for deriving information as to the deviation and inclination of the shaft axis derived from the position of the surfaces of rotationally symmetrical parts, a computer circuit means being connected to the electrical signal generating means for each measuring plane, feedback-free means in the computer circuit means for transforming the electrical signals to a further plane pair, limit value monitoring means in the computer circuit means for each plane for signalling the completion of the dynamic centering procedure, a further computer circuit means connected to the first computer circuit means for obtaining the first harmonic of an oscillation signal for each plane whereby an imaginary imbalance for each plane is obtained, comparison means in the further computer means for comparing the imaginary imbalance with the actually occurring imbalance in each plane, and terminating means in the further computer means for completing the adjusting procedure when uniformity of signal is obtained.

14. A switching mechanism as set forth in any one of claim 7, 8, 9, 10 or 11, wherein vector means is provided in the first computer circuit means whereby the electrical signals obtained thereby are formed into two components separated by 90°, such components being constructed and arranged to represent the differences between correlated adjusting drive and back-up means, adding means for vectorially adding the components in each plane, comparison means in the further computer means having a limiting value which determines completion of the dynamic centering procedure in each plane when the limit value is exceeded, loop means in the computer means for applying factors to the signals of each plane whereby imaginary imbalance components are obtained, and the comparison means to which the imaginary and actual imbalance components is applied is constructed and arranged to complete the adjusting procedure when the deviation signals reach uniformity.

* * * * *